US009990363B2

(12) United States Patent
Gade

(10) Patent No.: US 9,990,363 B2
(45) Date of Patent: Jun. 5, 2018

(54) METHODS AND APPARATUS OF USING CUSTOMIZABLE TEMPLATES IN INITIALIZING PROCESS CONTROL DEVICES

(71) Applicant: Emerson Process Management, Valve Automation, Inc., Waller, TX (US)

(72) Inventor: Mahesh Gade, Houston, TX (US)

(73) Assignee: Emerson Process Management, Valve Automation, Inc., Houston, TX (US)

( * ) Notice: Subject to any disclaimer, the term of this patent is extended or adjusted under 35 U.S.C. 154(b) by 139 days.

(21) Appl. No.: 14/553,583

(22) Filed: Nov. 25, 2014

(65) Prior Publication Data
US 2016/0147777 A1 May 26, 2016

(51) Int. Cl.
G06F 17/30 (2006.01)
G06F 9/50 (2006.01)
H04L 29/06 (2006.01)

(52) U.S. Cl.
CPC ...... G06F 17/30076 (2013.01); G06F 9/5027 (2013.01); G06F 17/30082 (2013.01); G06F 17/30106 (2013.01); H04L 69/08 (2013.01)

(58) Field of Classification Search
None
See application file for complete search history.

(56) References Cited

U.S. PATENT DOCUMENTS

| | | | |
|---|---|---|---|
| 6,449,715 B1 * | 9/2002 | Krivoshein | G05B 19/4185 700/1 |
| 7,209,481 B2 | 4/2007 | Mazo | |
| 7,457,853 B1 * | 11/2008 | Chari | G06F 9/44505 709/217 |
| 7,603,445 B1 * | 10/2009 | Fehrle | G06F 9/44505 370/254 |
| 8,548,956 B2 | 10/2013 | Allison et al. | |
| 2002/0046266 A1 | 4/2002 | Muralidhar et al. | |
| 2002/0161863 A1 * | 10/2002 | McGuire | H04L 41/0806 709/220 |
| 2003/0097427 A1 * | 5/2003 | Parry | H04L 29/06 709/220 |
| 2006/0141931 A1 | 6/2006 | Da Silva Neto | |

(Continued)

Primary Examiner — Benjamin C Wu
Assistant Examiner — Michael W Ayers
(74) Attorney, Agent, or Firm — Hanley, Flight & Zimmerman, LLC

(57) ABSTRACT

Methods and apparatus of using customizable templates in process control systems are disclosed. An example method includes initializing a first process control device associated with a first protocol based on a template file and a first parameter definition file. The template file includes global variables and associated values. The first parameter definition file defines a relationship between the global variables and first local variables of at least one of the first process control device or the first protocol. The example method also includes initializing a second process control device associated with a second protocol based on the template file and a second parameter definition file. The second parameter definition file defines a relationship between the global variables and second local variables of at least one of the second process control device or the second protocol. The first protocol is different from the second protocol.

28 Claims, 4 Drawing Sheets

(56) References Cited

U.S. PATENT DOCUMENTS

| | | | | |
|---|---|---|---|---|
| 2008/0127170 A1* | 5/2008 | Goldman | .................. | G06F 8/61 |
| | | | | 717/174 |
| 2009/0089247 A1* | 4/2009 | Blevins | .................. | G06Q 10/00 |
| 2011/0082569 A1* | 4/2011 | Bellville | ............ | G05B 19/0426 |
| | | | | 700/79 |
| 2014/0371882 A1* | 12/2014 | Nikhra | ................... | G05B 13/02 |
| | | | | 700/89 |
| 2015/0066162 A1* | 3/2015 | Hokeness | .......... | G05B 19/0426 |
| | | | | 700/28 |

* cited by examiner

```
TEMPLATE FILE

PARAMETER 1 = 45%
PARAMETER 2 = 45

IF PROTOCOL = PROTOCOL 1,
PARAMETER 3 = 80
ELSE
PARAMETER 3 = 20

IF DEVICE = DEVICE 1,
PARAMETER 3 = 80
ELSE
PARAMETER 3 = 50

PARAMETER 4 = 70
```
FIG. 2

```
PROTOCOL 1, DEVICE 1

PARAMETER 1
<<VARIABLE.1,
LENGTH =1,
UNITS = %
RANGE = 0, 100,
DEFAULT = 30>>

PARAMETER 2
<<VARIABLE.2,
LENGTH =1,
UNITS = PSI
RANGE = 20, 100,
DEFAULT = 45>>

PARAMETER 3
<<VARIABLE.3,
LENGTH =1,
UNITS = mA
RANGE = 20, 100,
DEFAULT = 45>>
```
FIG. 3

```
PROTOCOL 1, DEVICE 2

PARAMETER 1
<<VARIABLE.1,
LENGTH =1,
UNITS = %
RANGE = 0, 100,
DEFAULT = 30>>

PARAMETER 4
<<VARIABLE.4,
LENGTH =1,
UNITS = TEMP
RANGE = 0, 100,
DEFAULT = 60>>
```
FIG. 4

```
PROTOCOL 2, DEVICE 3

PARAMETER 1
<<VARIABLE.A,
LENGTH =2,
UNITS = %
RANGE = 0, 150,
DEFAULT = 45>>

PARAMETER 2
<<VARIABLE.B,
LENGTH =1,
UNITS = PSI
RANGE = 10, 100,
DEFAULT = 35>>

PARAMETER 3
<<VARIABLE.3,
DATA TYPE = BYTE,
UNITS = mA
RANGE = 15, 100,
DEFAULT = 60>>
```
FIG. 5

METHODS AND APPARATUS OF USING CUSTOMIZABLE TEMPLATES IN INITIALIZING PROCESS CONTROL DEVICES

FIELD OF THE DISCLOSURE

This disclosure relates generally to process control systems and, more particularly, to methods and apparatus of using customizable templates in process control systems.

BACKGROUND

Process devices are sometimes initialized and/or updated. The process of initializing and/or updating these process control devices may be time and labor intensive.

SUMMARY

An example method includes initializing a first process control device associated with a first protocol based on a template file and a first parameter definition file. The template file includes global variables and associated values. The first parameter definition file defines a relationship between the global variables and first local variables of at least one of the first process control device or the first protocol. The example method also includes initializing a second process control device associated with a second protocol based on the template file and a second parameter definition file. The second parameter definition file defines a relationship between the global variables and second local variables of at least one of the second process control device or the second protocol. The first protocol is different from the second protocol.

An example apparatus includes a database to store a template file, a first parameter definition file, and a second parameter definition file. The template file includes global variables and associated values. The first parameter definition file defines a relationship between the global variables and first local variables of at least one of a first process control device or a first protocol. The second parameter definition file defines a relationship between the global variables and second local variables of at least one of a second process control device or a second protocol. The apparatus also includes a processor to initialize the first process control device based on the template file and the first parameter definition file and to initialize the second process control device based on the template file and the second parameter definition file.

BRIEF DESCRIPTION OF THE DRAWINGS

FIG. 2 illustrates an example template file that can be used to initialize and/or update process control devices.

FIGS. 3-5 illustrate example device files that can be used to initialize and/or update process control devices.

DETAILED DESCRIPTION

Figure 1:
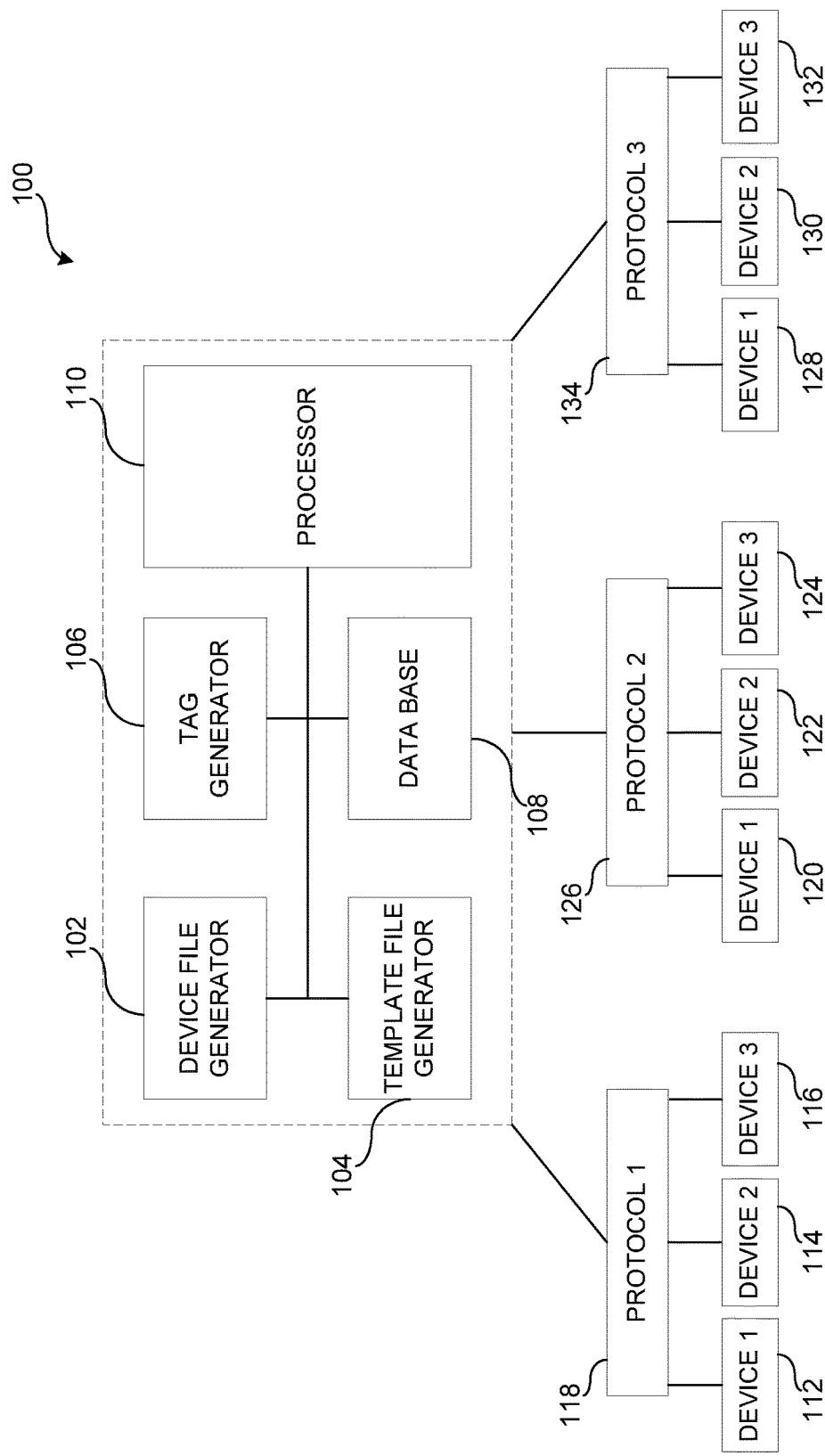
FIG. 1 illustrates an example apparatus that can be used to initialize and/or update process control devices.

Initializing and/or updating some process control systems includes the time and labor intensive process of manually customizing the device configuration, parameters and characterization for each process control device. Because, in some examples, the customization and/or the variable naming conventions are both protocol and device specific, updates to a device may need to be manually implemented on that particular device. In some examples, the devices are initialized using offline commissioning procedures and the devices are updated using offline commissioning files. In some instances, setting up and/or updating these process control systems involves a multi-step process including firmware upgrades, configuration, calibration and commissioning.

In contrast to the time and labor intensive approach mentioned above, the examples disclosed herein relate to providing process control devices with parameter definition files that enable communication protocol and device independent data (e.g., global variables) to be distributed to and used by the different devices and/or different protocols (e.g., Modbus® protocol, HART® protocol, Foundation Fieldbus protocol, Modbus over TCE-IP/Ethernet, Bluetooth, DeviceNet, Profibus, etc.). In some examples, the communication protocol and device independent data is provided via customizable templates. These example templates may be considered clone templates and are usable to distribute, for example, process parameters to different process control devices irrespective of the device-type and protocol-type. Because the global variables of the templates are device/communication protocol independent and are related to the corresponding local variables for the given device/communication protocol by the parameter definition file, the templates are forward compatible (e.g., usable with new protocols and new devices) and backward compatible (e.g., usable with old protocols and old devices).

In operation, a processor associated with a first field device uses data (e.g., global variables) from a template in combination with a parameter definition file of the first field device to propagate the data from the template to clone and/or initialize and/or update the first field device. For example, the processor may use the relationships between the global variables of the template file and the communication protocol specific translations of the global variables included in the parameter definition file of the first field device to propagate the data and initialize and/or update the first field device.

In some examples, the processor may compare the data of the template to device specific ranges included with the parameter definition file of the first field device to ensure that the data of the template is within a threshold value and/or a range of values. If, for example, the processor determines a value of the template data is outside of the threshold value and/or the range of values, the processor may generate an alert and/or set the value to a default value. In some examples, the parameter definition file may define different values for the respective parameters.

Similarly, a processor associated with a second field device uses data from the template in combination with a parameter definition file of the second field device to propagate the data and initialize and/or update the second field device. The first field device may be associated with (e.g., employ or use) the same communication protocol or a different communication protocol than the second field device. In some examples, to clone, initialize and/or update the first field device, the corresponding processor may use a first portion of the data from the template and, to clone, initialize and/or update the second field device, the corresponding processor may use a second portion from the data of the template different from the first portion.

In some examples, if the first device is malfunctioning, the processor retrieves the parameter values associated with the template from the first field device and compares the data to reference values of a backup template (e.g., clone template) to identify and/or change inconsistencies between the data to, for example, identify and rectify issues encountered by the malfunctioning device. After the data of the template is acceptable and/or matches the reference values of the backup template, the revised template is used by the processor in combination with the first field device parameter definition file to propagate the data and update the first field device to, for example, rectify the malfunctioning issues encountered.

FIG. 1 depicts an example apparatus 100 that can be used to initialize and/or update process control systems and/or their associated devices. In this example, the apparatus 100 includes a device file generator 102, a template file generator 104, a tag generator 106, a database 108 and a processor 110. In this example, the apparatus 100 is coupled (e.g., communicatively coupled) to first, second and third devices 112, 114 and 116 of a first communication protocol 118, first, second and third devices 120, 122, 124 of a second communication protocol 126 and first second and third devices 128, 130, 132 of a third communication protocol 134. In some examples, the device file generator 102, the template file generator 104, the tag generator 106, the database 108 and/or the processor 110 are located in a particular location (e.g., a process control system facility). In other examples, one or more of the device file generator 102, the template file generator 104, the tag generator 106, the database 108 and/or the processor 110 may be located in one or more different locations (e.g., a process control system facility, a process control device manufacturing company location, a third location, etc.).

In some examples, the device file generator 102 generates parameter definition files for each of the devices 112, 114, 116, 120, 122, 124, 128, 130, 132. In the illustrated example, the generated parameter definition files relate and/or translate global variable definitions to local variable definitions for a particular communication protocol 118, 126, 134 and/or device 112, 114, 116, 120, 122, 124, 128, 130, 132. In some examples, in addition to relating global and local variables, the parameter definition files include information such as, the length of the parameter(s), the units of the parameter(s), the range of the parameter values (e.g., maximum value, minimum value) and/or a default parameter value(s). In the illustrated example, the parameter definition files generated by the device file generator 102 may be transferred to the database 108 by the processor 110 for storage.

In some examples, the template file generator 104 generates a template(s) including global variable definitions and associated values. In some examples, the generated template file is customizable to enable parameter values to be updated, added, removed, changed, etc. In some examples, the template file(s) includes conditionals such as, for example, an if/then clause(s) that enables the devices 112, 114, 116 of the first communication protocol 118 to receive first parameter values and the devices 120, 122, 124, 128, 130, 132 of the second and/or third protocols 126, 134 to receive second parameter values different from the first parameter values. In some examples, the template file(s) includes a clause(s) that enables the first devices 112, 120, 128, regardless of their communication protocol 118, 126, 134, to receive a third parameter value(s) and for the second and third devices 114, 116, 122, 124, 130, 132, regardless of their communication protocol 118, 126, 134, to receive fourth parameter values different from the second parameter values. In the illustrated example, the template file(s) generated by the template file generator 104 may be transferred to the database 108 by the processor 110 for storage.

In some examples, the tag generator 106 automatically generates device and communication protocol specific identification tags for each of the devices 112, 114, 116, 120, 122, 124, 128, 130, 132. The tag generator 106 may randomly assign identification tags to the respective devices 112, 114, 116, 120, 122, 124, 128, 130, 132 using, for example, a random number generator or any other approach. In some examples, at least a portion of the respective identification tags may be customer specific and/or customizable. For example, the first three letters of a 6 letter/number identification tag may be ABC if the client wishes to use this particular naming convention for the devices 112, 114, 116 of the first communication protocol 118 and the first three letters of the 6 letter/number identification tag may be DEF if the client wishes to use this particular naming convention for the devices 120, 122, 124 of the second communication protocol 126. In some examples, the tag name is based on the device type, the protocol, channel and/or segment where the respective device is connected and/or based on an address assigned to the device. In the illustrated example, the identification tags generated by the tag generator 106 and their relation/association with the respective devices 112, 114, 116, 120, 122, 124, 128, 130, 132 may be transferred to the database 108 by the processor 110 for storage.

In operation, to initialize the first device 112 of the first communication protocol 118, the processor 110 uses the global variable definitions and values from a first template file in combination with the first device, first communication protocol parameter definition file to initialize the first device 112. In this example, the definition file defines and/or relates the global variables of the first template file to the local variables specific to the first device 112, first communication protocol 118. Thus, using the definition files of the respective devices 112, 114, 116, 120, 122, 124, 128, 130, 132, the global variables and associated values of the template file may be used to initialize the different devices 112, 114, 116, 120, 122, 124, 128, 130, 132 even if the local variables of the different devices 112, 114, 116, 120, 122, 124, 128, 130, 132 are differently defined.

In some examples, the processor 110 compares the value ranges for the different parameters included in the definition file to the values in the first template file to ensure that the values of the first template file are within an acceptable range for the first device 112. If the processor 110 identifies that one or more of the values of the template file are outside of the range defined within, for example, the definition file, the processor 110 may substitute a default value for the out-of-range value included within the template file. Additionally or alternatively, the processor 110 may generate an alert if one or more values of the template file are outside of the range defined within, for example, the definition file. After the data of the template is associated with the respective local variables of the device file, the processor 110 provides the data to the first device 112 to complete, for example, the initialization process.

To update the first device 112 of the first communication protocol 118 with different and/or new parameters, the processor 110 uses the global variable definitions and values from a second template file (e.g., an updated first template file, a different template file) in combination with the first device, first communication protocol parameter definition file to update the first device 112. Thus, using the definition files of the respective devices 112, 114, 116, 120, 122, 124, 128, 130, 132, the global variables and associated values of the second template file may be used to update the different devices 112, 114, 116, 120, 122, 124, 128, 130, 132 even if the local variables of the different devices 112, 114, 116, 120, 122, 124, 128, 130, 132 are differently defined. After the data of the second template is associated with the respective local variables of the device file, the processor 110 provides the data to the first device 112 to complete, for example, the updating process.

If the first device 112 is detected as malfunctioning and/or defective by, for example, the processor 110, the processor 110 can retrieve the values of the local variables and associated data from the first device 112 and compare the obtained local variables to reference values included in backup templates stored at, for example, the database 108 and/or compare the obtained local variables to values of a different template generated from a similar device type or a different device type. If the processor 110 identifies a discrepancy between the values of the obtained local variables and the reference values, in some examples, the processor 110 revises the corrupted values and/or data of the obtained local variables. Additionally or alternatively, if a discrepancy between the data is identified, the processor 110 may generate an alert. The processor 110 may use the updated values in combination with the device file to update the settings, configuration, etc. of the first device 112. After the data of the updated template is associated with the respective local variables of the device file, the processor 110 provides the data to the first device 112 to complete, for example, the resolution of the malfunctioning and/or defective first device 112.

While the above examples describe initializing, updating and/or resolving a malfunction/defect of the first device 112, the example apparatus 100 can similarly use the respective device files and a template file to initialize, update and/or resolve a malfunction of any of the devices 114, 116, 120, 122, 124, 128, 130, 132. Thus, using the global variable definitions of the parameter definition files, the processor 110 of the example apparatus 100 can use communication protocol and device independent data (e.g., global variables) to quickly and/or efficiently initialize and/or update the devices 112, 114, 116, 120, 122, 124, 128, 130, 132 without configuring and/or programming the devices 112, 114, 116, 120, 122, 124, 128, 130, 132 individually.

While an example manner of implementing the apparatus 100 of FIG. 1 is illustrated, one or more of the elements, processes and/or devices illustrated in FIG. 1 may be combined, divided, re-arranged, omitted, eliminated and/or implemented in any other way. Further, the example device generator 102, the example template generator 104, the example tag generator 106, the example database 108, the example processor 110 and/or, more generally, the example apparatus 100 of FIG. 1 may be implemented by hardware, software, firmware and/or any combination of hardware, software and/or firmware. Thus, for example, any of the example device generator 102, the example template generator 104, the example tag generator 106, the example database 108, the example processor 110 and/or, more generally, the example apparatus 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example device generator 102, the example template generator 104, the example tag generator 106, the example database 108, the example processor 110 and/or the example apparatus 100 is/are hereby expressly defined to include a tangible computer readable storage device or storage disk such as a memory, a digital versatile disk (DVD), a compact disk (CD), a Blu-ray disk, etc. storing the software and/or firmware. Further still, the example apparatus 100 of FIG. 1 may include one or more elements, processes and/or devices in addition to, or instead of, those illustrated, and/or may include more than one of any or all of the illustrated elements, processes and devices.

FIG. 2 illustrates an example template file 200 and FIGS. 3-5 illustrate example device files 300, 400, 500. In some examples, the template file 200 can be used to initialize and/or update any of the devices 112, 114, 116, 120, 122, 124, 128, 130, 132. In some examples, the device file 300 of FIG. 3 can be used in connection with the first device 112, the device file 400 of FIG. 4 can be used in connection with the second device 114 and the device file 500 of FIG. 5 can be used in connection with the third device 124.

Referring to FIG. 2, the example template file 200 includes global variables (e.g., parameter 1, parameter 2, parameter 3, parameter 4) and values assigned to the respective global variables. In the illustrated example, the template file 200 also includes conditionals such as, for example, if/then clauses for the different protocols 118, 126, 134 and for the different devices 112, 114, 116, 120, 122, 124, 128, 130, 132.

Referring to FIG. 3, the example device file 300 includes relationships between the global variables (e.g., parameter 1, parameter 2 and parameter 3) of the example template file 200 and the local variable definitions (e.g., variable.1, variable.2, variable.3) for the first communication protocol 118 and the first device 112. In the illustrated example, the device file 300 defines the length, the units (e.g., percentage, pressure, amperage, temperature, etc.), the range (e.g., the maximum and minimum value for a particular parameter) and the default value.

The example device file 400 of FIG. 4 includes the relationships between the global variables (e.g., parameter 1, parameter 4) of the example template file and the local definitions (e.g., variable.1, variable.4) for the first communication protocol 118 and the second device 114. A comparison between the device files 300, 400 shows that the first and second devices 112, 114 may use parameter values that are different and/or may use different parameters (e.g., parameter 2, parameter 4).

Referring to FIG. 5, the example device file 500 includes relationships between the global variables (e.g., parameter 1, parameter 2 and parameter 3) of the example template file 200 and the local variable definitions (e.g., variable.A, variable.B, variable.C) for the second communication protocol 126 and the third device 124. In the illustrated example, the device file 500 defines the length, the units (e.g., percentage, pressure, amperage, temperature, etc.), the range and the default value. A comparison between the device files 300 and 500 shows that the first and second protocols 118, 126 may differently define and/or have different naming conventions for their respective local variables (e.g., variable.1, variable.A, etc.).

Figure 6:
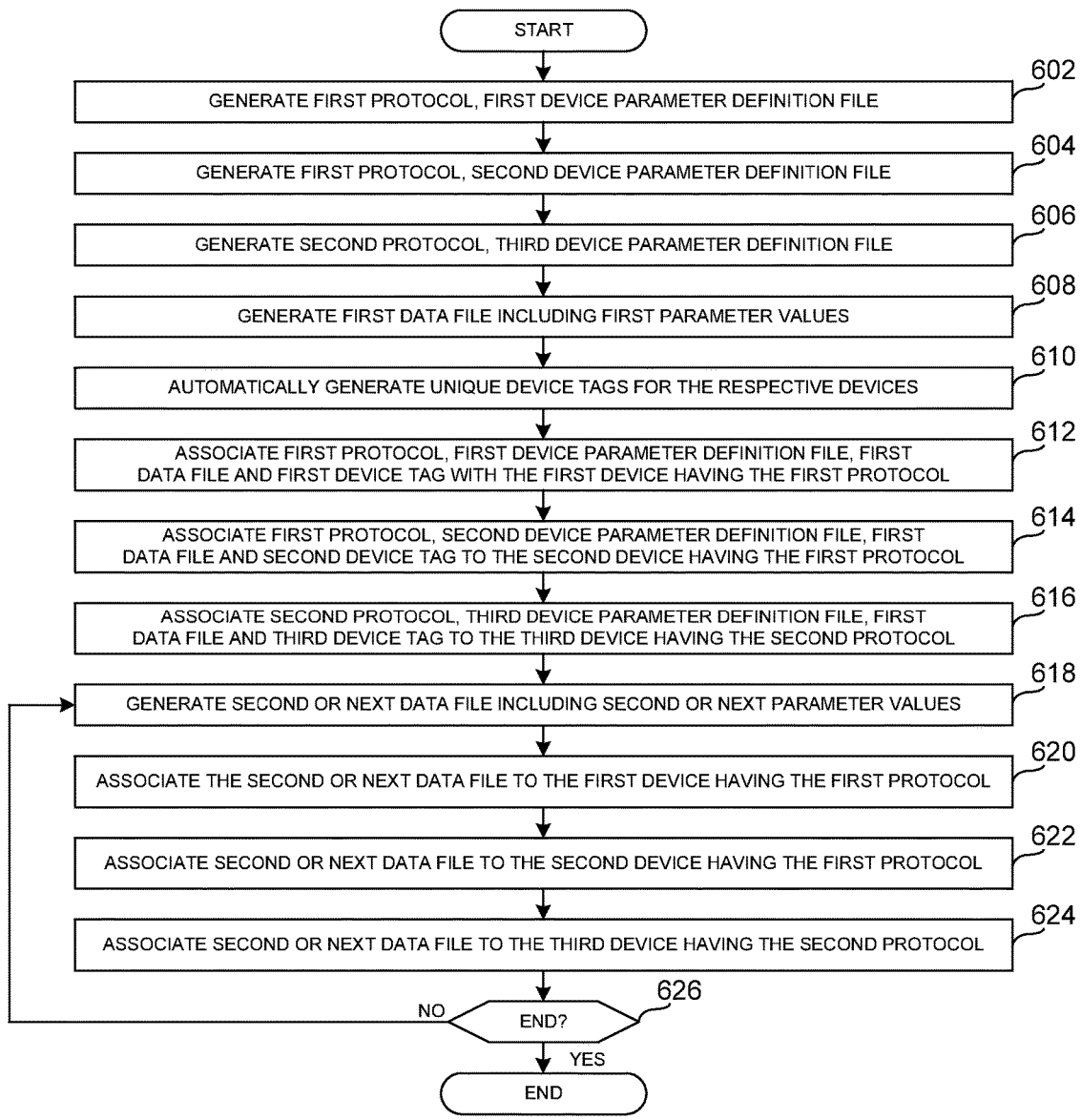
FIG. 6 is a flowchart representative of a method that may be performed to implement the apparatus of FIG. 1.

A flowchart representative of an example method for implementing the apparatus 100 of FIG. 1 is shown in FIG. 6. In this example, method may be implemented using machine readable instructions that comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example apparatus 100 may alternatively be used. For example, the order of execution of the blocks may be changed, and/or some of the blocks described may be changed, eliminated, or combined.

As mentioned above, the example process of FIG. 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIG. 1 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

The method of FIG. 6 begins by the device file generator 102 generating the device file 300 for the first device 112 of the first communication protocol 118 (block 602). The device file generator 102 generates the device file 400 for the second device 114 of the first communication protocol 118 (block 604). The device file generator 102 generates the device file 500 for the third device 124 of the second communication protocol 126 (block 606). In some examples, each of the definition and/or device files 300, 400, 500, etc. generated by the device file generator 102 are stored in the database 108. In some examples, the respective device files relate global and local variables for particular devices and/or protocol combinations.

The template file generator 104 generates the first template file and/or first data file 200 including global variables and values to be used to initialize and/or update the devices 112, 114, 116, 120, 122, 124, 128, 130, 132 (block 608). The tag generator 110 automatically generates and/or randomly assigns device and communication protocol specific identification tags to each of the devices 112, 114, 116, 120, 122, 124, 128, 130, 132 (block 610).

To initialize the first device 112, the processor 110 associates the global variable values with the corresponding local variables defined in the device file 300 and associates the first device 112 with the generated first device tag (block 612). To initialize the second device 114, the processor 110 associates the global variable values with the corresponding local variables defined in the device file 400 and associates the second device 114 with the generated second device tag (block 614). To initialize the third device 124, the processor 110 associates the global variable values with the corresponding local variables defined in the device file 500 and associates the third device 124 with the generated third device tag (block 616).

The template file generator 104 generates the second template file and/or second data file including global variables and values to be used to update the devices 112, 114, 116, 120, 122, 124, 128, 130, 132 (block 618). In some examples, one or more of the values included in the second template file may be different than one or more of the values in the first template file. In some examples, one or more parameters of the second template file may be different than one or more of the parameters of the first template file.

The processor 110 uses the global variables and the associated values from the second template/data file (e.g., similar to the template file 200 but including different values and/or global parameters) in combination with the first protocol, first device definition file 300 to update the first device 112 by associating the global variable values with the corresponding local variables defined in the device file 300 (block 620). The processor 110 uses the global variables and the associated values from the second template/data file in combination with the first protocol, second device definition file 400 to update the second device 114 by associating the global variable values with the corresponding local variables defined in the device file 400 (block 622). The processor 110 uses the global variables and the associated values from the second template/data file 200 in combination with the second protocol, third device definition file 500 to update the third device 124 by associating the global variable values with the corresponding local variables defined in the device file 500 (block 624). At block 626, the process determines whether or not to return to block 618.

Figure 7:
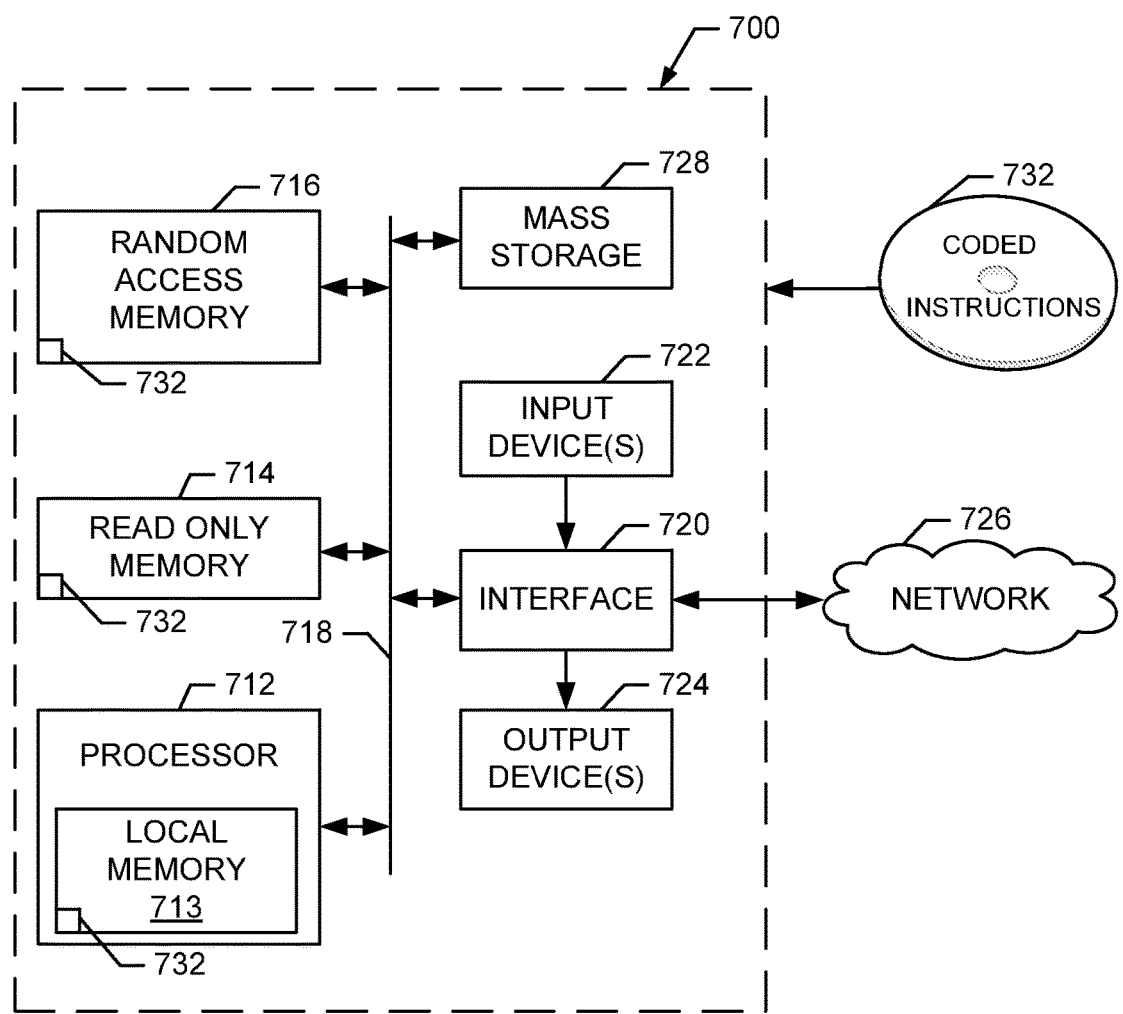
FIG. 7 is a processor platform to implement the method of FIG. 6 and the apparatus of FIG. 1.

FIG. 7 is a block diagram of an example processor platform 700 capable of executing instructions to implement the method of FIG. 6 and the apparatus of FIG. 1. The processor platform 700 can be, for example, a server, a personal computer, a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

Coded instructions 732 of FIG. 6 may be stored in the mass storage device 728, in the volatile memory 714, in the non-volatile memory 716, and/or on a removable tangible computer readable storage medium such as a CD or DVD.

From the foregoing, it will be appreciated that the above disclosed methods, apparatus and articles of manufacture reduce the overall time to clone, update, initialize, commission and/or configure process control devices having different protocols, thereby reducing overall plant shut-down time and/or turn-around time. The examples disclosed herein enable the flexibility to selectively update certain functionality of one or more process control devices without affecting the remaining functionality of the one or more process control devices. The examples disclosed herein enable selective and/or full functions (e.g., local variables) of the respective process control devices.

Using the examples disclosed herein, the multi-step process of upgrading firmware, configuring, calibrating and commissioning process control devices is consolidated and/or combined into a streamlined and/or single process, thereby enabling a process control system to be initialized and/or upgraded using fewer resources with less time, effort and/or cost. The examples disclosed herein enable mass updates using, for example, the example template files. The examples disclosed herein enable automatic recovery of parameters (e.g., critical parameters) that may have been corrupted in a particular process control device and/or used to resolve issues with the corresponding field device.

The examples disclosed herein enable technical support personal to reduce their trips to the field to resolve field issues by obtaining a copy of the template file from a malfunctioning and/or defective field device and comparing the obtained template file to reference values of a backup and/or healthy template file from, for example, the same or different devices and/or the same and/or different protocols, to identify and correct broken parameters of the customers template file. After the obtained file is acceptable and/or matches the reference values of the backup and/or healthy template file, the updated template file is provided to the corresponding field device and/or used to update the operating parameters of the field device.

The examples disclosed herein enable auto selection and/or configuration of variable parameters for a first communication protocol tag (e.g., Modbus tag), a second communication protocol tag (e.g., a HART tag), etc., to enable customers to provide a format and/or template of their choice. In some examples, the examples disclosed herein automatically tag field devices using customizable naming conventions.

The examples disclosed herein enable customizable data files to be created including global variables that are device independent and communication protocol independent. In some examples, the customizable data files include encrypted portions (e.g., using digital signatures) to substantially prevent unauthorized tampering and/or modification to ensure data integrity. The examples disclosed herein enable data files to be compared at the customer level to enable errors to be identified and/or corrected. The examples disclosed herein enable the data files to be customized at the customer level. The disclosed examples are scalable for future devices and/or enhancements. The example data files and/or templates disclosed herein are backward compatible and/or forward compatible. In some examples, if one of more data values are missing from the template file, the missing values will be discarded, skipped and/or initialized with default values as per customer preferences.

The examples disclosed herein enables flexibility to selectively update certain functionality of process control devices without affecting the remaining functionality of the devices. The examples disclosed herein enables full or selective functionality of the devices to be backed up and/or archived. The examples disclosed herein enables mass updates to process control devices from a processor(s) as compared to some methods that involve manually configuring each device. The examples disclosed herein enables auto recover of critical parameters that may have been corrupted by the device, etc.

As set forth herein, an example method includes initializing a first process control device associated with a first protocol based on a template file and a first parameter definition file. The template file includes global variables and associated values. The first parameter definition file defines a relationship between the global variables and first local variables of at least one of the first process control device or the first protocol. The method also includes initializing a second process control device associated with a second protocol based on the template file and a second parameter definition file. The second parameter definition file defines a relationship between the global variables and second local variables of at least one of the second process control device or the second protocol. The first protocol is different from the second protocol.

In some examples, the global variables are protocol independent. In some examples, the first process control device is different from the second process control device. In some examples, the example method also includes initializing a third process control device associated with the first protocol based on the template file and a third parameter definition file. The third parameter definition file defines a relationship between the global variables and third local variables of at least one of the third process control device or the first protocol. In some examples, the global variables are device independent. In some examples, the global variables are device independent and protocol independent. In some examples, the example method includes, prior to initializing the first process control device, generating the first parameter definition file.

In some examples, the example method includes, prior to initializing the first process control device, generating the second parameter definition file. In some examples, the example method includes identifying a malfunction of the first process control device and obtaining first values from the first process control device, the first values used to operate the first process control device based on the initialization. In some examples, the example method includes, comparing the first values to reference values to identify a difference between the first values and the reference values. In some examples, the example method includes, based on the difference between the first values and the reference values, modifying the first values to include second values and updating the first process control device based on the second values.

In some examples, the template file includes a first template file, and the method includes modifying the first template file to include a second template file. In some examples, the example method includes updating the first process control device based on the second template file and the first parameter definition file, the second template file includes global variables and associated values. In some examples, the example method includes encrypting the template file. In some examples, the example method includes automatically assigning respective device tags to the first process control device and the second process control device.

An example apparatus includes a database to store a template file, a first parameter definition file, and a second parameter definition file. The template file includes global variables and associated values. The first parameter definition file defines a relationship between the global variables and first local variables of at least one of a first process control device or a first protocol. The second parameter definition file defines a relationship between the global variables and second local variables of at least one of a second process control device or a second protocol. The apparatus also includes a processor to initialize the first process control device based on the template file and the first parameter definition file and initialize the second process control device based on the template file and the second parameter definition file.

In some examples, the processor is to generate the first parameter definition file and the second definition file prior to initializing the first process control device and the second process control device. In some examples, the template file includes a first template file and the database is to further store a second template file. In some examples, the processor is to update the first process control device based on the second template file and the first parameter definition file and update the second process control device based on the second template file and the second parameter definition file.

An example tangible machine readable storage medium having instructions stored thereon that, when executed, cause a machine to: initialize a first process control device associated with a first protocol based on a template file and a first parameter definition file, the template file includes global variables and associated values, the first parameter definition file defining a relationship between the global variables and first local variables of at least one of the first process control device or the first protocol; and initialize a second process control device associated with a second protocol based on the template file and a second parameter definition file, the second parameter definition file defining a relationship between the global variables and second local variables of at least one of the second process control device or the second protocol, the first protocol being different from the second protocol. In some examples, the machine readable instructions, when executed, cause the machine to update the first process control device base on a second template file and the first parameter definition file, the second template file include global variables and associated values.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
   initializing a first process control device associated with a first protocol based on a template file and a first parameter definition file, the template file comprising global variables and associated values, the first parameter definition file defining at least a first range of values, by:
   determining whether the associated values are within the first range of values;
   in response to determining that the associated values are within the first range of values, translating the global variables into first local variables of at least one of the first process control device or the first protocol using the first parameter definition file the first local variables being associated with at least one of a first length, a first unit type or the first range of values defined by the first parameter definition file; and
   configuring the first process control device using the first local variables; and
   initializing a second process control device associated with a second protocol based on the template file and a second parameter definition file, the second parameter definition file defining at least a second range of values, by:
   determining whether the associated values are within the second range of values;
   in response to determining that the associated values are within the second range of values, translating the global variables into second local variables of at least one of the second process control device or the second protocol using the second parameter definition file the first protocol being different from the second protocol, the second local variables being associated with at least one of a second length, a second unit type or the second range of values defined by the second parameter definition file; and
   configuring the second process control device using the second local variables.

2. The method of claim 1, wherein the global variables are protocol independent.

3. The method of claim 1, wherein the first process control device is different from the second process control device.

4. The method of claim 1, further comprising initializing a third process control device associated with the first protocol based on the template file and a third parameter definition file, the third parameter definition file defining at least a third range of values, by:
   determining whether the associated values are within the third range of values;
   in response to determining that the associated values are within the third range of values, translating the global variables into third local variables of at least one of the third process control device or the first protocol using the third parameter definition file, the third local variables being associated with at least one of a third length, a third unit type, or the third range of values defined by the third parameter definition file; and
   configuring the third process control device using the third local variables.

5. The method of claim 4, wherein the global variables are device independent.

6. The method of claim 4, wherein the global variables are device independent and protocol independent.

7. The method of claim 1, further comprising prior to initializing the first process control device, generating the first parameter definition file.

8. The method of claim 1, further comprising prior to initializing the first process control device, generating the second parameter definition file.

9. The method of claim 1, further comprising identifying a malfunction of the first process control device and obtaining first values from the first process control device, the first values used to operate the first process control device based on the initialization.

10. The method of claim 9, further comprising comparing the first values to reference values to identify a difference between the first values and the reference values.

11. The method of claim 10, further comprising based on the difference between the first values and the reference values, modifying the first values to comprise second values associated with the reference values and updating the first process control device based on the second values.

12. The method of claim 1, wherein the template file comprises a first template file, further comprising modifying the first template file to be a second template file.

13. The method of claim 12, wherein the global variables and the associated values comprise first global variables and first associated values, further comprising updating the first process control device based on the second template file and the first parameter definition file, the second template file comprising second global variables and second associated values.

14. The method of claim 1, further comprising encrypting the template file.

15. The method of claim 1, further comprising automatically assigning respective device tags to the first process control device and the second process control device.

16. An apparatus, comprising:
   a database to store a template file, a first parameter definition file, and a second parameter definition file, the template file comprising global variables and associated values, the first parameter definition file defining at least a first range of values the second parameter definition file defining a second range of values; and
   a processor to:
      initialize a first process control device associated with a first protocol based on the template file and the first parameter definition file by;
         determining whether the associated values are within the first range of values;
         translating the global variables into first local variables of at least one of the first process control device or the first protocol using the first parameter definition file, the first local variables being associated with at least one of a first length, a first unity type, or the first range of values defined by the first parameter definition file when the associated values are determined to be within the first range of values; and
         configuring the first process control device using the first local variables; and
      initialize a second process control device associated with a second protocol based on the template file and the second parameter definition file by:
         determining whether the associated values are within the second range of values;
         translating the global variables into second local variables of at least one of the second process control device or the second protocol using the second parameter definition file, the first protocol being different from the second protocol, the second local variables being associated with at least one of a second length, a second unity type, or the second range of values defined by the second parameter definition file when the associated values are determined to be within the second range of values; and
         configuring the second process control device using the second local variables.

17. The apparatus of claim 16, wherein the processor is to generate the first parameter definition file and the second parameter definition file prior to initializing the first process control device and the second process control device.

18. The apparatus of claim 16, wherein the template file comprises a first template file and wherein the database is to further store a second template file, wherein the processor is to:
   update the first process control device based on the second template file and the first parameter definition file; and
   update the second process control device based on the second template file and the second parameter definition file.

19. A tangible machine readable storage medium having instructions stored thereon that, when executed, cause a machine to:
   initialize a first process control device associated with a first protocol based on a template file and a first parameter definition file, the template file comprising global variables and associated values, the first parameter definition file defining at least a first range of values, by:
      determining whether the associated values are within the first range of values;
      translating the global variables into first local variables of at least one of the first process control device or the first protocol using the first parameter definition file the first local variables being associated with at least one of a first length, a first unit type or the first range of values defined by the first parameter definition file when the associated values are determined to be within the first range of values; and configuring the first process control device using the first local variables; and initialize a second process control device associated with a second protocol based on the template file and a second parameter definition file, the second parameter definition file defining at least a second range of values, by:

determining whether the associated values are within the second range of values;

translating the global variables into second local variables of at least one of the second process control device or the second protocol using the second parameter definition file the first protocol being different from the second protocol, the second local variables being associated with at least one of a second length, a second unit type or the second range of values defined by the second parameter definition file when the associated values are determined to be within the second range of values; and configuring the second process control device using the second local variables.

20. The tangible machine readable storage medium as defined in claim 19, wherein the machine readable instructions, when executed, cause the machine to update the first process control device based on a second template file and the first parameter definition file, the second template file comprising second global variables and second associated values.

21. The method of claim 13, wherein the first global variables and the first associated values are different from the second global variables and the second associated values.

22. The method of claim 1, further comprising comparing the associated values of the template file to corresponding thresholds defined by the first parameter definition file.

23. The method of claim 22, wherein, based on a first value of the associated values not satisfying the corresponding threshold, changing the first value to a second value, the second value satisfying the corresponding threshold.

24. The method of claim 1, wherein the first length is different from the second length, the first unit type is different from the second unit type, or the first range of values is different from the second range of values.

25. The method of claim 1, where a first one of the global variables has a corresponding first value for one of the first local variables and a corresponding second value for one of the second local variables, the first value is different from the second value.

26. The method of claim 1, further including updating the template file with a default value when the associated values do not satisfy the first range of values.

27. The method of claim 26, further including generating an alert when one or more of the associated values are not within the first range of values.

28. The method of claim 26, further including initializing the first process control device associated with the first protocol based on the updated template file and the first parameter definition file.

* * * * *

UNITED STATES PATENT AND TRADEMARK OFFICE
CERTIFICATE OF CORRECTION

PATENT NO. : 9,990,363 B2
APPLICATION NO. : 14/553583
DATED : June 5, 2018
INVENTOR(S) : Mahesh Gade It is certified that error appears in the above-identified patent and that said Letters Patent is hereby corrected as shown below:

In the Claims

Column 12, Line 42 Claim 1:
Replace "file" with --file,--.
Column 12, Line 44 Claim 1:
Replace "type" with --type,--.
Column 13, Line 66 Claim 16:
Replace "values" with --values,--.
Column 14, Line 64 Claim 19:
Replace "type" with --type,--.

Signed and Sealed this
Fourth Day of September, 2018

Andrei Iancu
*Director of the United States Patent and Trademark Office*